United States Patent
Han et al.

[11] Patent Number: 6,024,886
[45] Date of Patent: Feb. 15, 2000

[54] PLANARIZING METHOD FOR FABRICATING AN INDUCTIVE MAGNETIC WRITE HEAD FOR HIGH DENSITY MAGNETIC RECORDING

[75] Inventors: Cherng-Chyi Han, San Jose; Yongchang Feng, Livermore; Rodney E. Lee, San Jose; Hui-Chuan Wang, Pleasanton, all of Calif.

[73] Assignee: Headway Technologies, Inc., Milpitas, Calif.

[21] Appl. No.: 08/985,648

[22] Filed: Dec. 5, 1997

[51] Int. Cl.$^7$ .................................................. B44C 1/22
[52] U.S. Cl. ............................... 216/38; 216/22; 216/41; 216/66; 430/313; 430/319; 430/320; 29/603.07; 29/603.16; 29/603.18
[58] Field of Search ................................ 216/22, 38, 41, 216/66; 430/313, 319, 320; 29/603.07, 603.16, 603.18

[56] References Cited

U.S. PATENT DOCUMENTS

| | | | |
|---|---|---|---|
| 5,285,340 | 2/1994 | Ju et al. | 360/119 |
| 5,438,747 | 8/1995 | Krounbi et al. | 29/603 |
| 5,452,164 | 9/1995 | Cole et al. | 360/113 |
| 5,536,202 | 7/1996 | Appel et al. | 451/285 |
| 5,649,351 | 7/1997 | Cole et al. | 29/603.14 |
| 5,901,431 | 5/1999 | Santini | 29/603.14 |
| 5,901,432 | 5/1999 | Armstrong et al. | 29/603.14 |

*Primary Examiner*—Nam Nguyen
*Assistant Examiner*—Steven H. VerSteeg
*Attorney, Agent, or Firm*—George O. Saile; Stephen B. Ackerman; Alek P. Szecsy

[57] ABSTRACT

Within a method for forming a magnetic transducer head there is first provided a substrate having formed thereover a lower magnetic pole layer in turn having formed thereupon a gap filling layer which is substantially planar. There is then formed upon the gap filling layer a patterned upper magnetic pole tip layer which serves as an etch mask layer for forming from the gap filling layer and the lower magnetic pole layer a patterned gap filling layer and an etched lower magnetic pole layer having a lower magnetic pole tip integral thereto, while simultaneously forming an etched patterned upper magnetic pole tip layer from the patterned upper magnetic pole tip layer. There is then formed upon the etched patterned upper magnetic pole tip layer and the etched lower magnetic pole layer a backfilling insulator layer to a thickness greater than a thickness of the etched patterned upper magnetic pole tip layer plus a thickness of the patterned gap filling layer plus a thickness of the lower magnetic pole tip. There is then planarized the backfilling insulator layer to form a patterned planarized backfilling insulator layer an exposed upper surface of which is coplanar with an exposed upper surface of the etched patterned upper magnetic pole tip layer. Finally, there is then formed a patterned upper magnetic pole layer contacting the exposed upper surface of the etched patterned upper magnetic pole tip layer.

11 Claims, 4 Drawing Sheets

PLANARIZING METHOD FOR FABRICATING AN INDUCTIVE MAGNETIC WRITE HEAD FOR HIGH DENSITY MAGNETIC RECORDING

BACKGROUND OF THE INVENTION

1. Field of the Invention

The present invention relates generally to inductive magnetic write transducer heads employed in magnetic data recording and retrieval. More particularly, the present invention relates to narrow write track width inductive magnetic write transducer heads employed in magnetic data recording and retrieval.

2. Description of the Related Art

The recent and continuing advances in computer and information technology have been made possible not only by the correlating advances in the functionality, reliability and speed of semiconductor integrated circuits, but also by the correlating advances in the storage density of direct access storage devices (DASDs) employed in digitally encoded magnetic data storage and retrieval.

Storage density of direct access storage devices (DASDs) is typically measured as areal storage density of a magnetic data storage medium formed upon a rotating magnetic data storage disk within a direct access storage device (DASD) magnetic data storage enclosure. The areal storage density of the magnetic data storage medium is typically defined largely by the track width, the track spacing and the linear magnetic domain density within the magnetic data storage medium. The track width, the track spacing and the linear magnetic domain density of the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium which is formed upon the rotating magnetic data storage disk; and (3) the separation distance of the magnetic read-write head from the magnetic data storage medium formed upon the rotating magnetic data storage disk.

With regard in particular to a track width within a magnetic data storage medium, the track width within the magnetic data storage medium is typically in turn largely defined by a pole tip width of an inductive magnetic write transducer pole tip employed within an inductive magnetic write transducer head which is employed in writing digitally encoded magnetic data into the magnetic data storage medium. Thus, although it is therefore desirable to employ within digitally encoded magnetic data storage and retrieval inductive magnetic write transducer heads having formed therein increasingly narrower inductive magnetic write transducer pole tips within inductive magnetic write transducer pole layers, fabricating inductive magnetic write transducer heads having formed therein increasingly narrower inductive magnetic write transducer pole tips within inductive magnetic write transducer pole layers is not entirely without problems within digitally encoded magnetic data storage and retrieval.

In particular, it is common in the art of inductive magnetic write transducer head fabrication to form inductive magnetic write transducer pole tips through conventional photoresist masking or photoresist frame plating methods which form inductive magnetic write transducer pole tips within inductive magnetic write transducer pole layers formed over irregular surfaces within inductive magnetic write transducer head fabrications. Such irregular surfaces typically include, but are not limited to, surfaces having formed thereupon or thereover magnetic inductor coil layers and associated magnetic inductor coil insulator layers. Due to the topographic variations within the irregular surfaces, there is typically required within the conventional photoresist masking or photoresist frame plating methods sufficiently thick photoresist layers such that optimally fine linewidth features, such as but not limited to optimally narrow linewidth inductive magnetic write transducer pole tips within inductive magnetic write transducer pole layers, are not readily fabricated through the conventional photoresist masking and photoresist frame plating methods. As is understood by a person skilled in the art, optimally fine linewidth features are precluded due to a correlation between: (a) minimal achievable patterned photoresist layer linewidth; and (b) depth of focus limitations, when forming a patterned photoresist layer from a particularly thick blanket photoresist layer. It is thus desirable within the art of inductive magnetic write transducer head fabrication to provide photolithographic methods through which inductive magnetic write transducer pole tips within inductive magnetic write transducer pole layers may be fabricated over irregular surfaces while employing comparatively thin photoresist layers which provide inductive magnetic write transducer pole tips with optimally narrow write track width. It is towards that goal that the present invention is generally directed.

Various novel inductive magnetic transducer heads, and methods of fabrication of those various novel inductive magnetic transducer heads, have been disclosed within the art of inductive magnetic transducer head fabrication.

For example, Ju et al., in U.S. Pat. No. 5,285,340, discloses for use within magnetic data storage and retrieval: (1) a thin film inductive magnetic transducer head with conformable pole tips; and (2) a method for forming the thin film inductive magnetic transducer head with the conformable pole tips. The method employs a single photolithographic process step to provide within the thin film inductive magnetic transducer head a pole tip structure comprising a first pole tip layer formed co-extensively with both a gap forming layer and a second pole tip layer, thus providing a thin film magnetic transducer head with pole tips which are precisely aligned and of a width and of a thickness which are precisely controlled.

In addition, Krounbi et al., in U.S. Pat. No. 5,438,747, discloses a method for fabricating a thin film merged inductive write-magnetoresistive (MR) read magnetic read-write transducer head with aligned pole tips. The method employs an upper magnetic pole tip within an upper magnetic pole layer as an etch mask layer when etching through an ion beam etching method a corresponding lower magnetic pole tip within a lower magnetic pole layer which simultaneously serves as a magnetoresistive (MR) sensor layer shield layer within the thin film merged inductive write-magnetoresistive (MR) read magnetic read-write transducer head. In addition, the ion beam etch method employs an ion beam at an oblique angle with respect to the upper magnetic pole tip within the upper magnetic pole layer to form while employing the upper magnetic pole tip as the etch mask layer the lower magnetic pole tip which is substantially vertically aligned with the upper magnetic pole tip.

Finally, Cole et al., in U.S. Pat. No. 5,452,164, discloses a thin film inductive magnetic write transducer head which employs: (1) a narrow pole tip structure at an air bearing surface (ABS) of the thin film inductive magnetic write transducer head; and (2) a well defined zero throat level at the side opposite the air bearing surface (ABS) side of the narrow pole tip structure. The method employs a photolithographic patterning of an upper magnetic pole tip layer, a gap filling dielectric layer and lower magnetic pole tip within a lower magnetic pole layer prior to forming contacting the upper magnetic pole tip layer an upper magnetic pole layer. The invention as disclosed by Cole et al. is generally directed towards a problem analogous to the problem addressed within the present invention, but the present invention addresses the problem through a patentably distinct method.

The teachings of the foregoing three references are incorporated herein fully by reference.

Desirable within the art of inductive magnetic write transducer head fabrication are photolithographic methods through which inductive magnetic pole tips within inductive magnetic pole layers may be fabricated over irregular surfaces while employing comparatively thin photoresist layers which provide inductive magnetic pole tips with optimally narrow write track width. Particularly desirable within the art of inductive magnetic write transducer head fabrication are methods which realize the foregoing objects while providing manufacturing processes with enhanced manufacturing process control. It is towards the foregoing objects that the present invention is both generally and more specifically directed.

SUMMARY OF THE INVENTION

A first object of the present invention is to provide a photolithographic method for forming an inductive magnetic pole tip within an inductive magnetic pole layer formed over an irregular surface within an inductive magnetic write transducer head.

A second object of the present invention is to provide a method in accord with the first object of the present invention, where the photolithographic method employs a comparatively thin photoresist layer which provides the inductive magnetic pole tip with an optimally narrow write track width.

A third object of the present invention is to provide a method in accord with the first object of the present invention or the second object of the present invention, which method provides a manufacturing process with enhanced manufacturing process control.

A fourth object of the present invention is to provide a method in accord with the first object of the present invention, the second object of the present invention or the third object of the present invention, which method is readily manufactuable.

In accord with the objects of the present invention, there is provided by the present invention a method for fabricating a magnetic transducer head. To practice the method of the present invention, there is first provided a substrate. There is then formed over the substrate a lower magnetic pole layer. There is then formed upon the lower magnetic pole layer a gap filling layer which is substantially planar. There is then formed through a first photolithographic method upon the gap filling layer a patterned upper magnetic pole tip layer. There is then etched while employing the patterned upper magnetic pole tip layer as a etch mask layer the gap filling layer and the lower magnetic pole layer to form a patterned gap filling layer and an etched lower magnetic pole layer having a lower magnetic pole tip integral thereto, where the patterned gap filling layer and the lower magnetic pole tip are aligned and co-extensive with an etched patterned upper magnetic pole tip layer formed from the patterned upper magnetic pole tip layer. There is then formed upon the etched patterned upper magnetic pole tip layer and the etched lower magnetic pole layer a backfilling insulator layer. The backfilling insulator layer is formed to a thickness greater than a thickness of the etched patterned upper magnetic pole tip layer plus a thickness of the patterned gap filling layer plus a thickness of the lower magnetic pole tip. There is then planarized the backfilling insulator layer to form a patterned planarized backfilling insulator layer which leaves exposed the upper surface of the etched patterned upper magnetic pole tip layer. Finally, there is then formed through a second photolithographic method a patterned upper magnetic pole layer contacting the exposed upper surface of the etched patterned upper magnetic pole tip layer.

There is provided by the present invention a photolithographic method for forming an inductive magnetic pole tip within an inductive magnetic pole layer formed over an irregular surface within an inductive magnetic write transducer head, where the photolithographic method employs a comparatively thin photoresist layer which provides the inductive magnetic write pole tip with an optimally narrow write track width. The method of the present invention realizes the foregoing objects by: (1) forming within the inductive magnetic write transducer head through a first photolithographic method a patterned upper magnetic pole tip layer upon a gap filling layer which is substantially planar, and (2) subsequently stitching to the patterned upper magnetic pole tip layer a patterned upper magnetic pole layer formed through a second photolithographic method, where the patterned upper magnetic pole layer may be, and typically is, formed over an irregular surface within the inductive magnetic write transducer head. Since the patterned upper magnetic pole tip layer is formed upon a gap filling layer which is substantially planar, there may be employed when forming the patterned upper magnetic pole tip layer through the first photolithographic method a patterned photoresist layer which is comparatively thin and thus provides the upper magnetic pole tip layer of optimally narrow write track width.

The method of the present invention provides a manufacturing process with enhanced manufacturing process control. Since within the method of the present invention the backfilling insulator layer is planarized to expose the upper surface of the etched patterned upper magnetic pole tip layer as a planarizing stop layer, the method of the present invention provides greater process control than methods conventional in the art which planarize otherwise equivalent backfilling insulator layers without the benefit of a planarizing stop layer.

The method of the present invention is readily manufacturable. The present invention employs methods and materials as are otherwise generally known in the art of inductive magnetic write transducer head fabrication, where the process parameters within the method of the present invention are controlled in a fashion which provides novelty within the method of the present invention. Thus, the method of the present invention is readily manufacturable.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides a photolithographic method for forming an inductive magnetic pole tip within an inductive magnetic pole layer formed over an irregular surface within an inductive magnetic write transducer head, where the photolithographic method employs a comparatively thin photoresist layer which provides the inductive magnetic write pole tip with an optimally narrow write track width. The method of the present invention realizes the foregoing objects by: (1) forming within the inductive magnetic write tranducer head through a first photolithographic method an upper magnetic pole tip layer upon a gap filling layer which is substantially planar; and (2) subsequently stitching to the upper magnetic pole tip layer a patterned upper magnetic pole layer formed through a second photolithographic method, where the patterned upper magnetic pole layer may be, and typically is, formed over an irregular surface within the inductive magnetic write transducer head. Since the upper magnetic pole tip layer is formed upon a gap filing layer which is substantially planar, there may be employed within the first photolithographic method when forming the upper magnetic pole tip layer a patterned photoresist layer which is comparatively thin and thus provides the upper magnetic pole tip layer of optimally narrow write track width.

The method of the present invention also provides a manufacturing process with enhanced manufacturing process control. Since within the method of the present invention a backfilling insulator layer is planarized to expose the upper surface of an etched patterned upper magnetic pole tip layer as a planarizing stop layer, the method of the present invention provides greater process control than methods conventional in the art which planarize otherwise equivalent backfilling insulator layers without the benefit of a planarizing stop layer.

Although the preferred embodiment of the present invention illustrates the method of the present invention employed in forming an inductive write-magnetoresistive (MR) read magnetic transducer head, the present invention may be employed in forming magnetic transducer heads including but not limited to inductive write magnetic transducer heads, inductive read magnetic transducer heads, inductive read-write magnetic transducer heads and inductive write-magnetoresistive (MR) read magnetic transducer heads. Advantageously, as is similarly illustrated within the preferred embodiment of the present invention, the present invention may also be employed in forming a merged inductive write-magnetoresistive (MR) read magnetic transducer head, where one of the magnetic inductor pole layers within the inductive write portion of the merged inductive write-magnetoresistive (MR) read magnetic transducer head simultaneously serves as one of the shield layers within the magnetoresistive (MR) read portion of the merged inductive write-magnetoresistive (MR) magnetic transducer head. Finally, as is understood by a person skilled in the art, although the preferred embodiment of the present invention illustrates the method of the present invention employed in forming an inductive write-magnetoresistive (MR) read magnetic transducer head employed in non-contact digital magnetic data recording and retrieval, the method of the present invention may also be employed in form inductive write magnetic transducer heads employed within magnetic data recording applications including but not limited to analog magnetic data recording applications, digital magnetic data recording applications, non-contact magnetic data recording applications and contact magnetic data recording applications.

Figure 1:
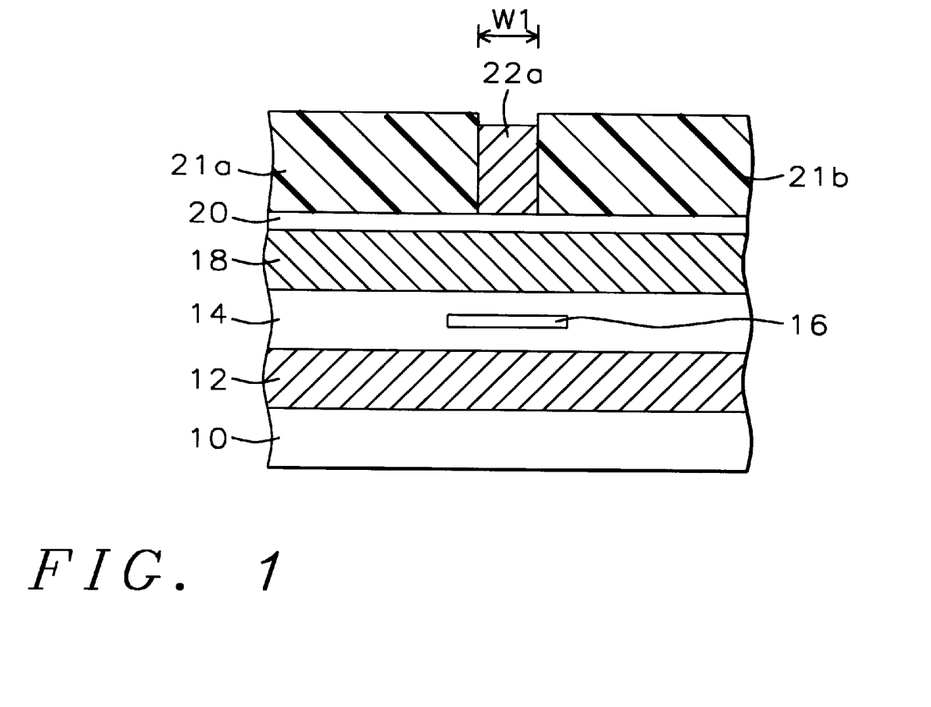
FIG. 1 to FIG. 7 show a series of schematic air bearing surface (ABS) view diagrams and cross-sectional diagrams illustrating the results of forming a merged inductive write-magnetoresistive (MR) read magnetic transducer head in accord with a preferred embodiment of the present invention.

Referring now to FIG. 1 to FIG. 7, there is shown a series of air bearing surface (ABS) view diagrams and schematic cross-sectional diagrams illustrating the results of progressive stages in fabricating within an inductive write-magnetoresistive (MR) read magnetic transducer head employed within digitally encoded magnetic data storage and retrieval a magnetic inductor write element in accord with a preferred embodiment of the present invention. Shown in FIG. 1 is a schematic air bearing surface (ABS) view diagram of the inductive write-magnetoresistive (MR) read magnetic transducer head at an early stage in its fabrication.

Shown in FIG. 1 is a substrate 10 having formed thereupon or thereover several layers employed in forming an inductive write-magnetoresistive (MR) read magnetic transducer head employed in digitally encoded magnetic data storage and retrieval within a direct access storage device (DASD) magnetic data storage enclosure. As shown within FIG. 1, the substrate 10, as well as the several layers formed thereupon or thereover are illustrated from the view of the air bearing surface (ABS) of the inductive write-magnetoresistive (MR) read magnetic transducer head. Within FIG. 1, the layers formed upon or over the substrate 10 include: (1) a first shield layer 12 formed upon the substrate 10; (2) a first insulator layer 14 having a magnetoresistive (MR) sensor element layer 16 formed therein formed upon the first shield layer 12; (3) a lower magnetic pole layer 18, which simultaneously serves as a second shield layer, formed upon the first insulator layer 14; (4) a gap filling layer 20 formed upon the lower magnetic pole layer 18; and (5) a pair of patterned photoresist layers 21a and 21b which have formed therebetween a patterned upper magnetic pole tip layer 22a formed upon the gap filling layer 20. Each of the foregoing substrate and layers may be formed through methods and materials as are generally conventional in the art of thin film magnetic transducer head fabrication or more particularly conventional in the art of thin film inductive write-magnetoresistive (MR) read magnetic transducer head fabrication.

For example, although it is known in the art of thin film magnetic transducer head fabrication that substrates are typically formed of non-magnetic ceramic materials such as but not limited to borides, nitrides, carbides, oxides and composites of borides, nitrides, carbides and/or oxides, for the preferred embodiment of the present invention the substrate 10 is preferably, although not exclusively, formed of an alumina-titanium carbide non-magnetic ceramic material as is common in the art of thin film magnetic transducer head fabrication. The substrate 10 is preferably formed of dimensions such that there may readily be fabricated from the substrate 10 a slider employed within a direct access storage device (DASD) magnetic data storage enclosure.

Similarly, although it is also known in the art of thin film magnetic transducer head fabrication that insulator layers may be formed through any of several methods and materials, including but not limited to chemical vapor deposition (CVD) methods, plasma enhanced chemical vapor deposition (PECVD) methods and physical vapor deposition (PVD) sputtering methods through which may be formed insulator layers of insulator materials including but not limited to silicon oxide insulator materials, silicon nitride insulator materials and aluminum oxide insulator materials, for the preferred embodiment of the present invention both the first insulator layer 14 and the gap filling layer 20 are each preferably formed of an aluminum oxide insulator material formed over the substrate 10 through a chemical vapor deposition (CVD) method or a physical vapor deposition (PVD) sputtering method, as is common in the art of thin film magnetic transducer head fabrication. Preferably, the first insulator layer 14 is formed to a thickness of from about 500 to about 3000 angstroms while having the magnetoresistive (MR) sensor element layer 16 symmetrically disposed within the thickness of the first insulator layer 14. Preferably, the gap filling layer 20 is formed at a thickness of from about 1000 to about 5000 angstroms. Significant to the present invention is the additional requirement that the gap filling layer 20 is substantially planar. Typically and preferably, the gap filling layer 20 fulfills this requirement by appropriately planarzing, where necessary, layers formed beneath the gap filling layer 20.

With respect to the magnetoresistive (MR) sensor element layer 16, as is understood by a person skilled in the art, the magnetoresistive (MR) sensor element layer 16 preferably comprises a multilayer formed of a permalloy (nickel:iron, 80:20, w:w) magnetoresistive (MR) material layer longitudinally magnetically exchange biased and aligned through coupling with a pair of patterned antiferromagnetic material layers formed and aligned upon opposite ends of the permalloy magnetoresistive (MR) material layer. The patterned antiferromagnetic material layers are preferably formed of an iron-manganese (50:50, w:w) alloy, as is common in the art of thin film inductive write-magnetoresistive (MR) read magnetic transducer head fabrication. Other materials may, however, be employed in forming the magnetoresistive (MR) sensor element layer 16. Preferably the permalloy magnetoresistive (MR) material layer within the magnetoresistive (MR) sensor element layer 16 is formed to a thickness of from about 50 to about 500 angstroms, while the patterned anti-ferromagnetic material layers are formed thereupon at a thickness of from about 100 to about 500 angstroms to define a trackwidth upon the permalloy magnetoresistive (MR) material layer of from about 0.5 to about 5 microns.

With respect to the first shield layer 12 and the lower magnetic pole layer 18 which simultaneously serves as the second shield layer for the magnetoresistive sensor element layer 16, within the preferred embodiment of the present invention, both the first shield layer 12 and the lower magnetic pole layer 18 are preferably formed of a permalloy (nickel:iron, 80:20, w:w) magnetic material formed contacting opposite sides of the first dielectric layer 14 through a physical vapor deposition (PVD) sputtering method, although other methods and materials may also be employed in forming the first shield layer 12 and the lower magnetic pole layer 18. Preferably, the first shield layer 12 is formed upon the substrate 10 to a thickness of from about 5000 to about 20000 angstroms, while the lower magnetic pole layer 18 is preferably formed upon the first insualator layer 14 to a thickness of from about 20000 to about 40000 angstroms.

With respect to the patterned photoresist layers 21a and 21b having formed therebetween the patterned upper magnetic pole tip layer 22a, the patterned photoresist layers 21a and 21b may be formed from any of several photoresist materials as are conventional in the art of thin film magnetic transducer head fabrication, including photoresist materials chosen from the general groups of photoresist materials including but not limited to positive photoresist materials and negative photoresist materials. Since within the preferred embodiment of the present invention the gap filling layer 20 is substantially planar, the patterned photoresist layers 21a and 21b may be formed of a minimal thickness needed to accommodate the thickness of the patterned upper magnetic pole tip layer 22a, while still providing the patterned upper magnetic pole tip layer 22a of optimally minimal width W1 which correlates with an optimally minimal write track width of an inductive magnetic write transducer element formed from the upper magnetic pole tip layer 22a. Typically and preferably,the thickness of the patterned photoresist layers 21a and 21b is from about 10000 to about 50000 angstroms, while the separation width W1 of the patterned photoresist layers 21a and 21b is from about 0.2 to about 2.0 microns.

Finally, with respect to the patterned upper magnetic pole tip layer 22a, the patterned upper magnetic pole tip layer 22a is preferably formed of materials analogous or equivalent to the materials employed in forming the lower magnetic pole layer 18 and the first shield layer 12. Thus, the patterned upper magnetic pole tip layer 22a is preferably formed of a permalloy (nickel:iron, 80:20, w:w) magnetic material. Within the preferred embodiment of the present invention the patterned upper magnetic pole tip layer 22a is preferably formed through a photoresist frame plating method as is conventional in the art of thin film magnetic transducer head fabrication, while employing the patterned photoresist layers 21a and 21b as a photoresist frame. Preferably, the patterned upper magnetic pole tip layer 22a so formed is formed to a thickness of from about 10000 to about 45000 angstroms.

Although not specifically illustrated within the schematic cross-sectional diagram of FIG. 1, and although not generally preferred within the method of the present invention, it is also feasible within the method of the present invention to form a patterned upper magnetic pole tip layer otherwise equivalent to the patterned upper magnetic pole tip layer 22a through patterning of a corresponding blanket upper magnetic pole tip layer having a single patterned photoresist layer formed thereupon. Such a method for forming a patterned upper magnetic pole tip layer is generally not preferred within the method of the present invention since substantial quantities of the corresponding blanket upper magnetic pole tip layer would of necessity need to be etched when forming the patterned upper magnetic pole tip layer.

Figure 2:
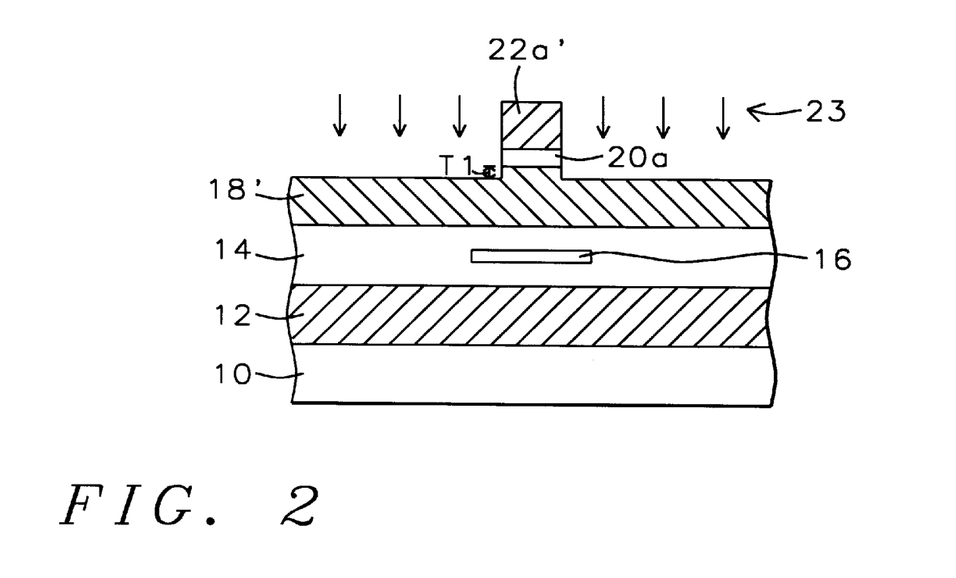

Referring now to FIG. 2, there is shown a schematic air bearing surface (ABS) view diagram illustrating the results of further processing of the inductive write-magnetoresistive read magnetic transducer head whose schematic cross-sectional diagram is illustrated in FIG. 1. Shown in FIG. 2 is a schematic air bearing surface (ABS) view diagram of an inductive write-magnetoresistive (MR) read magnetic transducer head otherwise equivalent to the inductive write-magnetoresistive (MR) read magnetic transducer head whose schematic air bearing surface (ABS) diagram is illustrated in FIG. 1, but wherein there is first stripped from the inductive write-magnetoresistive (MR) read magnetic transducer head the patterned photoresist layers 21a and 21b. The patterned photoresist layers 21a and 21b may be stripped from the inductive write-magnetoresistive (MR) read magnetic transducer head whose schematic air bearing surface (ABS) diagram is illustrated in FIG. 1 to provide the inductive write-magnetoresistive (MR) read magnetic transducer head whose schematic air bearing surface (ABS) diagram is illustrated in FIG. 2 through methods as are conventional in the art of thin film magnetic transducer head fabrication. Such methods will typically include, but are not limited to, wet chemical stripping methods and dry oxygen plasma stripping methods.

Also shown in FIG. 2 is the results of sequentially etching the gap filling layer 20 and the lower magnetic pole layer 18 through use of an etchant 23 while employing the patterned upper magnetic pole layer 22a as an etch mask layer to form a patterned gap filling layer 20a and an etched lower magnetic pole layer 18' having a lower magnetic inductor pole tip integral thereto aligned with the patterned gap filling layer 20a and an etched patterned upper magnetic pole tip layer 22a' formed from the patterned upper magnetic pole tip layer 22a.

Within the preferred embodiment of the present invention, the etchant 23 may be any of several anisotropic etchants employed within any of several anisotropic etch methods as are known in the art of thin film magnetic transducer head fabrication, including but not limited to anisotropic focused ion beam etch methods and anisotropic defocused ion beam etch methods, where the anisotropic etch method may employ reactive ions and/or non-reactive ions. For the preferred embodiment of the present invention, the etchant 23 is preferably employed within an anisotropic ion beam etch method to form within the etched lower magnetic pole layer 18' the lower magnetic pole tip of thickness T1, as illustrated in FIG. 2, of from about 1.0 to about 3.0 times the thickness of the patterned gap filling layer 20a.

Figure 3:
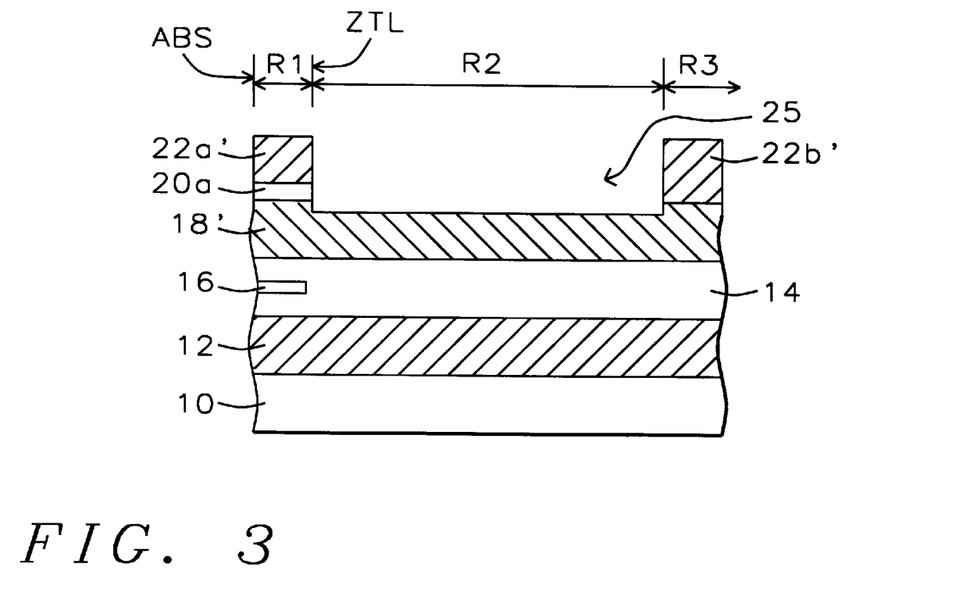

Referring now to FIG. 3, there is shown a schematic cross-sectional diagram of an inductive write-magnetoresistive (MR) read magnetic transducer head corresponding with the inductive write-magnetoresistive (MR) read magnetic transducer head whose schematic air bearing surface (ABS) view diagram is illustrated in FIG. 2. Shown in FIG. 3 is a schematic cross-sectional diagram illustrating features as are otherwise illustrated in FIG. 2, but wherein there is additionally shown an etched back gap interconnection stud layer 22b'. Within the preferred embodiment of the present invention, the etched back gap interconnection stud layer 22b' is formed simultaneously with, and through the same methods and materials as, the etched patterned upper magnetic pole tip layer 22a'. However, prior to forming the etched patterned upper magnetic pole tip layer 22a' and the etched back gap interconnection stud layer 22b', there is first etched a via through the gap filling layer 20 as illustrated in FIG. 1, so that the etched back gap interconnection stud layer 22b' makes contact with the etched lower magnetic pole layer 18'. There is thus formed as illustrated within the schematic cross-sectional diagram of FIG. 3 an aperture 25 bounded by the etched patterned upper magnetic pole tip layer 22a', the patterned gap filling layer 20a, the etched lower magnetic pole layer 18'and the etched back gap interconnection layer 22b'. The aperture 25 so formed has sidewalls of approximately equal height since the thickness of the patterned gap fling layer 20a is typically minimal in comparison with the thicknesses of the etched patterned upper magnetic pole layer tip 22a' or the etched back gap interconnection stud layer 22b'.

As is illustrated in FIG. 3, there is thus formed within the inductive write-magnetoresistive (MR) read magnetic transducer head of the preferred embodiment of the present invention: (1) a pole tip region R1 defined by the air bearing surface (ABS) of the inductive write-magnetoresistive (MR) read magnetic transducer head and a zero throat level (ZTL) of the etched patterned upper magnetic pole tip layer 22a', the patterned gap filling layer 20a and the etched lower magnetic pole layer 18'; (2) a coil region R2 defined principally by the aperture 25; and (3) a back gap region R3 where the etched back gap interconnection stud layer 22b' contacts the etched lower magnetic pole layer 18'.

Figure 4:
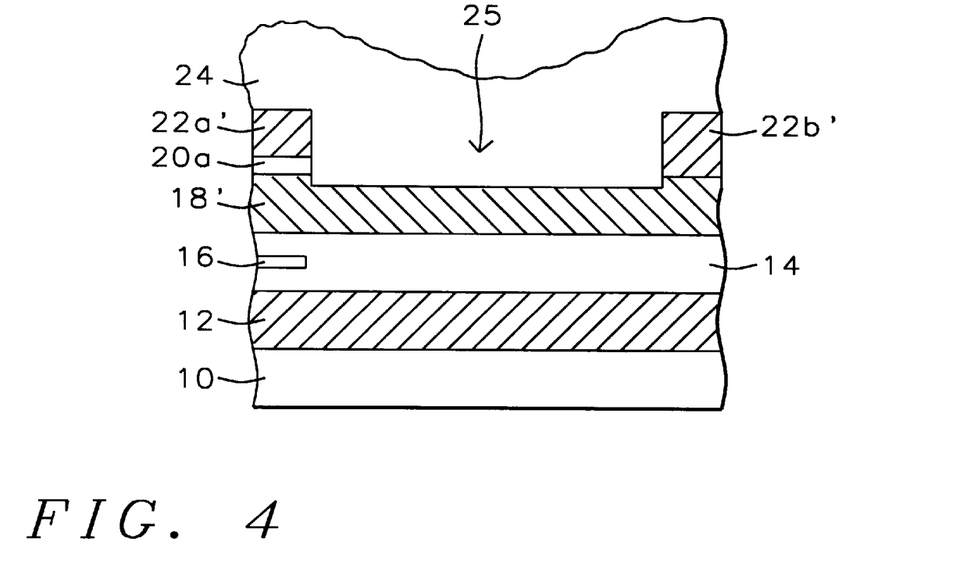

Referring now to FIG. 4, there is shown a schematic cross-sectional diagram illustrating the results of further processing of the inductive write-magnetoresistive (MR) read magnetic transducer head whose schematic cross-sectional diagram is illustrated in FIG. 3. Shown in FIG. 4 is a schematic cross-sectional diagram of an inductive write-magnetoresistive (MR) read magnetic transducer head otherwise equivalent to the inductive write-magnetoresistive (MR) read magnetic transducer head whose schematic cross sectional diagram is illustrated in FIG. 3, but wherein there is formed over the inductive write-magnetoresistive (MR) read magnetic transducer head and within the aperture 25 a backfilling insulator layer 24.

Within the preferred embodiment of the present invention, the backfilling insulator layer 24 may be formed through any of several methods and materials as are typically employed in forming insulator layers within thin film magnetic transducer heads. Thus, the backfilling insulator layer 24 may be formed through methods and materials analogous or equivalent to the methods and materials employed in forming the first insulator layer 14 or the gap filling layer 20 as illustrated within the schematic air bearing surface (ABS) view diagram of FIG. 1. Preferably, although not exclusively, within the preferred embodiment of the present invention the backfilling insulator layer 24 is formed of an aluminum oxide insulator material deposited through a chemical vapor deposition (CVD) method or a physical vapor deposition (PVD) sputtering method, as is common in the art of thin film magnetic transducer head fabrication, although other methods and materials may be employed in forming the backfilling insulator layer 24. The backfilling insulator layer 24 is formed to a thickness greater than the thickness T1 of the lower magnetic pole tip within the etched lower magnetic pole layer 18' plus the thickness of the patterned gap filling layer 20a plus the thickness of the etched patterned upper magnetic pole tip layer 22a'. Thus, the thickness of the backfilling insulator layer 24 will typically and preferably be from about 15000 to about 35000 angstroms.

Figure 5:
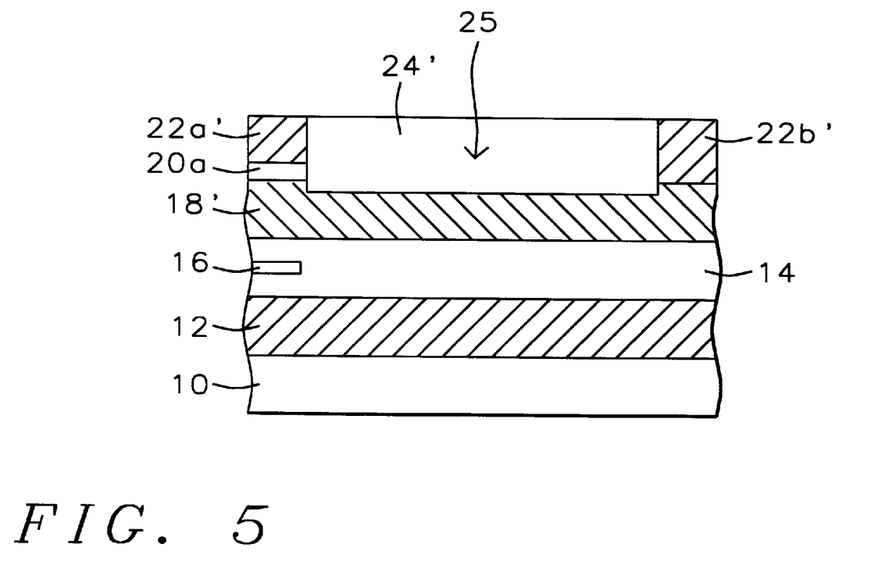

Referring now to FIG. 5, there is shown a schematic cross-sectional diagram illustrating the results of further processing of the inductive write-magnetoresistive (MR) read magnetic transducer head whose schematic cross-sectional diagram is illustrated in FIG. 4. Shown in FIG. 5 is a schematic cross-sectional diagram of an inductive write-magnetoresistive (MR) read magnetic transducer head otherwise equivalent to the inductive write-magnetoresistive (MR) read magnetic transducer head whose schematic cross-sectional diagram is illustrated in FIG. 4, but wherein the backfilling insulator layer 24 has been patterned and planarized through a planarizing method to form a patterned planarized backfilling insulator layer 24' within the aperture 25. As is illustrated within the schematic cross-sectional diagram of FIG. 5, the backfilling insulator layer 24 is planarized until there is reached the etched patterned upper magnetic pole tip layer 22a' and the etched back gap interconnection stud layer 22b'. Thus, as is also illustrated within the FIG. 5, a planarized upper surface of the patterned planarized backfilling insulator layer 24' is co-planar with both an exposed upper surface of the etched upper magnetic pole tip layer 22a' and an exposed upper surface of the etched back gap interconnection stud layer 22b'. Thus within the preferred embodiment of the present invention the etched patterned upper magnetic pole tip layer 22a' and the etched back gap interconnection stud layer 22b' are employed as planarizing stop layers which provide enhanced manufacturing process control and uniformity when forming through the preferred embodiment of the present invention the patterned planarized back filling insulator layer 24' within the aperture 25.

When forming from the backfilling insulator layer 24 whose schematic cross-sectional diagram is illustrated in FIG. 4 the patterned planarized backfilling insulator layer 24' whose schematic cross-sectional diagram is illustrated in FIG. 5, there may be employed planarizing methods as are conventional in the art of thin film magnetic transducer head fabrication. Such planarizing methods may include, but are not limited to, reactive ion etch (RIE) etchback planarizing methods and chemical mechanical polish (CMP) planarizing methods. For the preferred embodiment of the present invention, where the etched patterned upper magnetic pole tip layer 22a' is preferably formed of a permalloy magnetic material and the backfilling insulator layer 24 is preferably formed of an aluminum oxide insulator material, there is preferably employed a chemical mechanical polish (CMP) planarizing method employing an alumina slurry polishing composition. Preferably, the chemical mechanical polish (CMP) planarizing method also employs: (1) a platen pressure of from about 1 to about 3 pounds per square inch (psi); (2) a polishing head rotation speed of from about 15 to about 23 revolutions per minute (rpm); (3) a platen counter-rotation speed of from about 30 to about 40 revolutions per minute (rpm); (4) a substrate 10 temperature of from about 19 to about 25 degrees centigrade; (5) an IC-1400 polishing pad available from Rodel, Inc.; and (6) an aqueous alumina slurry of about 0.5 to about 2.0 weight percent alumina at a flow rate of from about 120 to about 200 cubic centimeters per minute (ccm). When employing within the preferred embodiment of the present invention the above chemical mechanical polish (CMP) method, materials and parameters, there is typically observed at the polish stop planarizing stop endpoint when the upper surface of the etched patterned upper magnetic pole layer 22a' is exposed a discernable change in table current. Thus, there is provided when forming the inductive write-magnetoresistive (MR) read magnetic transducer head whose schematic cross-sectional diagram is illustrated in FIG. 5 a chemical mechanical polish (CMP) planarizing method with enhanced manufacturing process control in comparison with otherwise equivalent chemical mechanical polish (CMP) planarizing methods, or other planarizing methods, which do not employ a planarizing stop layer.

Figure 6:
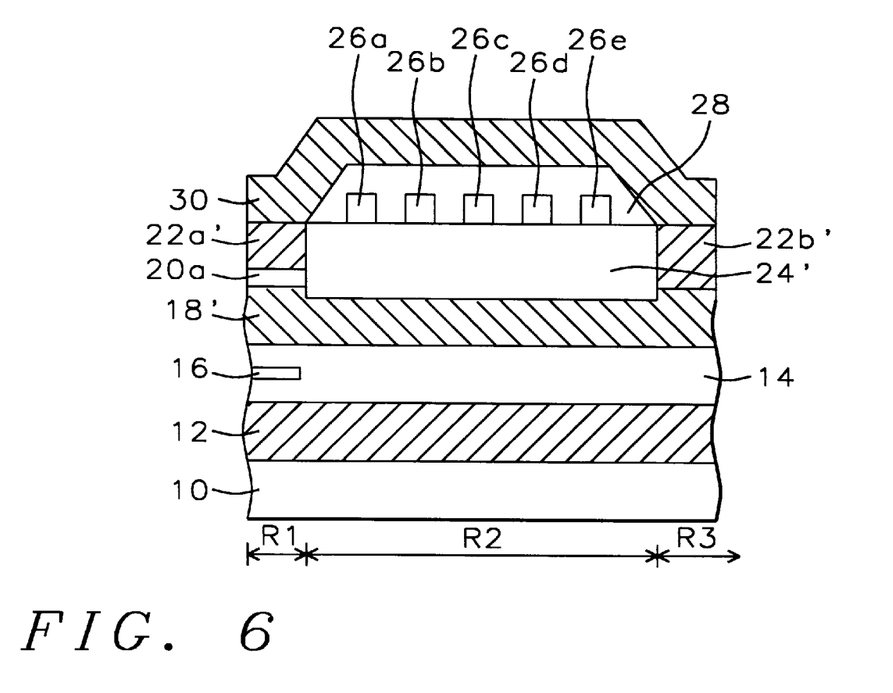

Referring now to FIG. 6, there is shown a schematic cross-sectional diagram illustrating the results of further processing of the inductive write-magnetoresistive (MR) read magnetic transducer head whose schematic cross-sectional diagram is illustrated in FIG. 5. Shown in FIG. 6 is a schematic cross-sectional diagram of an inductive write-magnetoresistive (MR) read magnetic transducer head otherwise equivalent to the inductive write-magnetoresistive (MR) read magnetic transducer head whose schematic cross-sectional diagram is illustrated in FIG. 5, but wherein: (1) there is formed upon the patterned planarized gap filling layer 24' a series of coil layers 26a, 26b, 26c, 26d and 26e; (2) there is formed encapsulating the series of coil layers 26a, 26b, 26c, 26d and 26e an intra-coil insulator layer 28; and (3) there is formed upon the intra-coil insulating layer 28, and bridging through contact between the etched patterned upper magnetic pole tip layer 22a' and the etched back gap interconnection stud layer 22b', a patterned upper magnetic pole layer 30.

Within the preferred embodiment of the present invention, the series of coil layers 26a, 26b, 26c, 26d and 26e, the intra-coil insulator layer 28 and the patterned upper magnetic pole layer 30 are formed through methods and materials as are otherwise conventional in the art of thin film magnetic transducer head fabrication.

For example, the series of coil layers 26a, 26b, 26c, 26d and 26e is preferably formed of a copper containing conductor material deposited and photolithographically patterned through methods as are conventional in the art of thin film magnetic transducer head fabrication to form the series of coil layers 26a, 26b, 26c, 26d and 26e each of thickness about 20000 to about 40000 angstroms, while simultaneously each having a linewidth of from about 2.0 to about 3.0 microns and a pitch of from about 3.0 to about 5.0 microns.

In addition, the intra-coil insulator layer 28 is typically, although not exclusively, formed as a composite series of insulator layers which is chosen to completely fill and subsequently planarize the apertures defined by the patterned coil layers 26a, 26b, 26c, 26d and 26e. The intra-coil insulator layer 28 is subsequently then also tapered through etch methods are conventional in the art of magnetic transducer head fabrication to form an appropriate surface contour upon which may be formed the upper magnetic pole layer 30. Preferably, the intra-coil insulator layer 28 so formed is formed to a thickness of from about 20000 to about 50000 angstroms.

Finally, the patterned upper magnetic pole layer 30 is preferably formed through methods and materials analogous or equivalent to the methods and materials through which is formed the etched patterned upper magnetic pole tip layer 22a'. Typically and preferably, such methods will include, but are not limited to, photoresist frame plating methods and photolithographic patterning methods. Preferably, the patterned upper magnetic pole layer 30 is formed to a thickness of from about 20000 to about 40000 angstroms. As is understood by a person skilled in the art, the patterned upper magnetic pole layer 30 may be formed as a laminate of several separate layers of equivalent or differing magnetic materials in order to provide the inductive-write magnetoresistive (MR) read magnetic transducer head whose schematic cross-sectional diagram is illustrated in FIG. 6 with optimal properties.

Similarly, as is also understood by a person skilled in the art, due to the irregular surface topography induced by the series of coil layers 26a, 26b, 26c, 26d and 26e, and the intra coil insulator layer 28, photolithographic methods through which is formed the patterned upper magnetic pole layer 30 as illustrated in FIG. 6 typically require a substantially thicker patterned photoresist layer, typically on the order of from about 20000 to about 80000 angstroms, in comparison with the patterned photoresist layers 21a and 21b which are employed in defining the patterned upper magnetic pole tip layer 22a as illustrated in FIG. 1. Due to the greater thickness of this patterned photoresist layer, a narrow linewidth (and thus a narrow write track width) of the patterned upper magnetic pole layer 30 within pole tip region R1 of the inductive write-magnetoresistive (MR) read magnetic transducer head whose schematic cross-sectional diagram is illustrated in FIG. 6 is generally precluded. A minimum linewidth or aperture width of this second patterned photoresist layer is typically from about 0.5 to about 4.0 microns.

Figure 7:
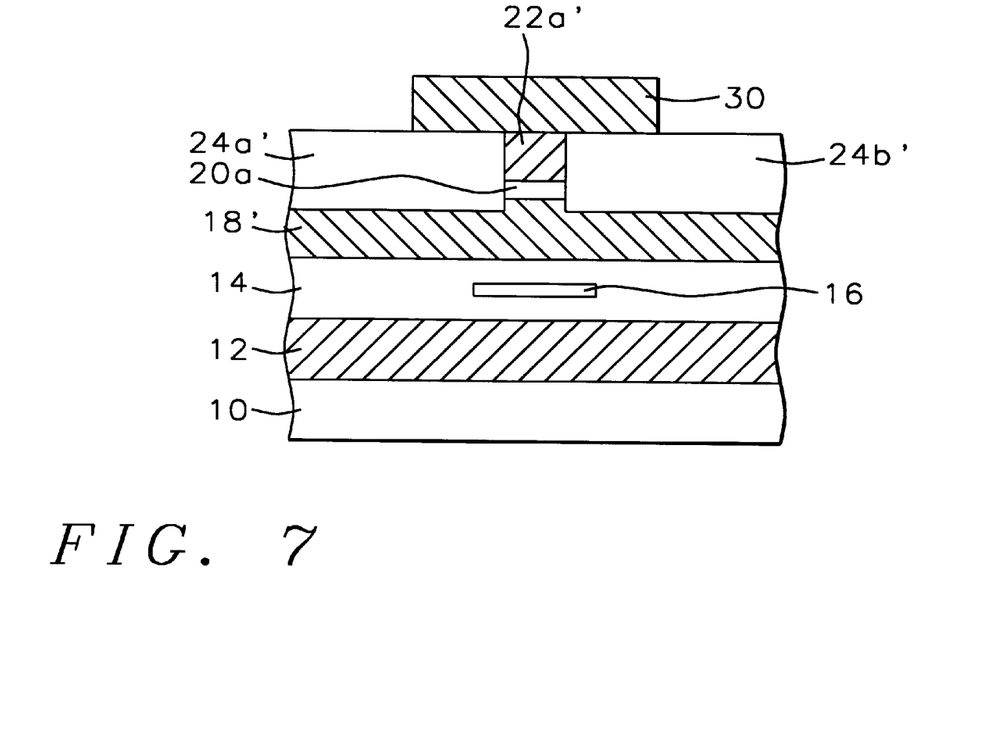

Referring now to FIG. 7, there is shown a schematic air bearing surface (ABS) view diagram of an inductive write-magnetoresistive (MR) read magnetic transducer head corresponding with the inductive write-magnetoresistive (MR) read magnetic transducer head whose schematic cross-sectional diagram is illustrated in FIG. 6, but wherein the patterned planarized backfilling insulator layer 24' is now instead represented as a pair of patterned planarized backfilling insulator layers 24a' and 24b'. As is illustrated in FIG. 7, the patterned upper magnetic pole layer 30 is formed with a greater width than the etched patterned upper magnetic pole tip layer 22a' since, as discussed above, the patterned upper magnetic pole layer 30 is formed over an irregular surface including the series of coil layers 26a, 26b, 26c, 26d and 26e and the intra-coil dielectric layer 28, while the etched patterned upper magnetic pole tip layer 22a' is formed originally upon the substantially planar gap filling layer 20 as illustrated in FIG. 1. Thus, there is formed through the preferred embodiment of the present invention through a photolithographic method an inductive magnetic pole tip within an inductive magnetic pole layer formed over an irregular surface within an inductive magnetic write transducer head, where the photolithographic method employs a comparatively thin photoresist layer which provides the inductive magnetic write pole tip with an optimally narrow write track width.

As is understood by a person skilled in the art, there may, in addition to the various layers as illustrated within the schematic air bearing surface (ABS) view of FIG. 7, also be formed within the inductive write-magnetoresistive (MR) read magnetic transducer head of the preferred embodiment of the present invention additional layers are conventional in the art of thin film magnetic transducer head fabrication. Such additional layers may include, but are not limited to, additional shield layers, conductor layers, insulator layers, interconnection layers and passivation layers.

As is similarly understood by a person skilled in the art, the preferred embodiment of the present invention is illustrative of the present invention rather than limiting of the present invention. Revisions and modifications may be made to materials, structures and dimensions through which is fabricated an inductive write-magnetoresistive (MR) read magnetic transducer head in accord with the preferred embodiment of the present invention while still providing a magnetic transducer head in accord with the present invention, as defined by the appended claim

What is claimed is:

1. A method for forming a magnetic transducer head comprising:

providing a substrate;

forming over the substrate a lower magnetic pole layer;

forming upon the lower magnetic pole layer a gap filling layer which is substantially planar;

forming through a first photolithographic method upon the gap filling layer a patterned upper magnetic pole tip layer;

etching a while employing the patterned upper magnetic pole tip layer as a etch mask layer, the gap filling layer and the lower magnetic pole layer to form a patterned gap filling layer and an etched lower magnetic pole layer having a lower magnetic pole tip integral thereto, where the patterned gap filling layer and the lower magnetic pole tip are aligned with an etched patterned upper magnetic pole tip layer formed from the patterned upper magnetic pole tip layer;

forming upon the etched patterned upper magnetic pole tip layer and the etched lower magnetic pole layer a backfilling insulator layer, the backfilling insulator layer being formed to a thickness greater than a thickness of the etched patterned upper magnetic pole tip layer plus a thickness of the patterned gap filling layer plus a thickness of the lower magnetic pole tip;

planarizing the backfilling insulator layer to form a patterned planarized backfilling insulator layer an exposed upper surface of which is coplanar with an exposed upper surface of the etched patterned upper magnetic pole tip layer; and forming through a second photolithographic method a patterned upper magnetic pole layer contacting the exposed upper surface of the etched patterned upper magnetic pole tip layer.

2. The method of claim 1 wherein the magnetic transducer head is chosen from the group of magnetic transducer heads consisting of inductive write magnetic transducer heads, inductive read magnetic transducer heads, inductive write-inductive read magnetic transducer heads, inductive write-mapnetoresistive (MR) read magnetic transducer heads and merged inductive write-magnetoresistive (MR) read magnetic transducer heads.

3. The method of claim 1 wherein the backfilling insulator layer is formed from an insulator material selected from the group of insulator materials consisting of silicon oxide insulator materials, silicon nitride insulator materials and aluminum oxide insulator materials.

4. The method of claim 1 wherein the planarizing method is chosen from the group of planarizing methods consisting of reactive ion etch (RIE) etchback planarizing methods and chemical mechanical polish (CMP) planarizing methods.

5. The method of claim 1 wherein the etched patterned upper magnetic pole tip layer serves as a planarizing stop layer when forming the patterned planarized backfilling insulator layer from the backfilling insulator layer.

6. The method of claim 1 wherein:

the first photolithographic method employs a patterned first photoresist layer of thickness from about 10000 to about 50000 angstroms to provide the patterned upper magnetic pole tip layer of a first linewidth from about 0.2 to about 2.0 microns, and the second photolithographic method employs a patterned second photoresist layer of thickness from about 20000 to about 80000 angstroms to provide the patterned upper magnetic pole layer of a second linewidth from about 0.5 to about 4.0 microns.

7. A method for forming an inductive write-magnetoresistive (MR) read magnetic transducer head comprising:

providing a substrate, the substrate having a first side and a second side;

forming over the first side of the substrate a magnetoresistive (MR) sensor element layer;

forming over the first side of the substrate a lower magnetic pole layer;

forming upon the lower magnetic pole layer a gap filling layer which is substantially planar;

forming through a first photolithographic method upon the gap filling layer a patterned upper magnetic pole tip layer;

etching, while employing the patterned upper magnetic pole tip layer as a etch mask layer, the gap filling layer and the lower magnetic pole layer to form a patterned gap filling layer and an etched lower magnetic pole layer having a lower magnetic pole tip integral thereto, where the patterned gap filling layer and the lower magnetic pole tip are aligned with an etched patterned upper magnetic pole tip layer formed from the patterned upper magnetic pole tip layer;

forming upon the etched patterned upper magnetic pole tip layer and the etched lower magnetic pole layer a backfilling insulator layer, the backfilling insulator layer being formed to a thickness greater than a thickness of the etched patterned upper magnetic pole tip layer plus a thickness of the patterned gap filling layer plus a thickness of the lower magnetic pole tip;

planarizing the backfilling insulator layer to form a patterned planarized backfilling insulator layer an exposed upper surface of which is coplanar with an exposed upper surface of the etched patterned upper magnetic pole tip layer; and forming through a second photolithographic method a patterned upper magnetic pole layer contacting the exposed upper surface of the etched patterned upper magnetic pole tip layer.

8. The method of claim 7 wherein the backfilling insulator layer is formed from an insulator material selected from the group of insulator materials consisting of silicon oxide insulator materials, silicon nitride insulator materials and aluminum oxide insulator materials.

9. The method of claim 7 wherein the planarizing method is chosen from the group of planarizing methods consisting of reactive ion etch (RIE) etchback planarizing methods and chemical mechanical polish (CMP) planarizing methods.

10. The method of claim 7 wherein the etched patterned upper magnetic pole tip layer serves as a planarizing stop layer when forming the patterned planarized backfilling insulator layer from the backfilling insulator layer.

11. The method of claim 7 wherein:

the first photolithographic method employs a patterned first photoresist layer of thickness from about 10000 to about 50000 angstroms to provide the patterned upper magnetic pole tip layer of a first linewidth from about 0.2 to about 2.0 microns; and the second photolithographic method employs a patterned second photoresist layer of thickness from about 20000 to about 80000 angstroms to provide the patterned upper magnetic pole layer of a second linewidth from about 0.5 to about 4.0 microns.

* * * * *